Oct. 5, 1971   H. BAIER   3,609,812
TIRE HEATING PRESS
Filed March 24, 1969   4 Sheets-Sheet 4

3,609,812
TIRE HEATING PRESS
Heinrich Baier, Hamburg, Germany, assignor to Fried. Krupp Gesellschaft mit beschrankter Haftung, Essen, Germany
Filed Mar. 24, 1969, Ser. No. 809,491
Claims priority, application Germany, Mar. 23, 1968,
P 17 78 058.4
Int. Cl. B29h 5/02
U.S. Cl. 18—17 K    3 Claims

ABSTRACT OF THE DISCLOSURE

A press for shaping a raw tire and placing same into a multi-sectional mold for vulcanizing the tire, according to which the raw tire is inserted into the press so as to be substantially equally spaced from the mold sections while the equal spacing between said mold sections and the tire is maintained during the closing i.e. mutual approaching operation of the mold sections by means of a preferably hydraulic control system.

---

The present invention relates to a tire heating press for curving and vulcanizing raw tires, especially belted raw tires, with a two-sectional or more-sectional tire mold having a vertical central axis and with a curving bellows clamped in between an upper and lower bellows clamping ring, and with bead rings adapted to be moved out of the tire mold sections for centering the raw tire.

With heretofore known tire heating presses of the type involved, the raw tire is centered between the tire mold sections moved away from each other, and on bead rings and subsequently the mold is closed while at the same time the raw tire is lowered. The relative movements occurring in this connection between the raw tire and the tire mold sections are not controlled and may bring about faulty vulcanization.

It is, therefore, an object of the present invention to overcome the above mentioned drawbacks.

It is another object of this invention to provide a tire heating press which will bring about a simultaneous insertion of the raw tire into the upper and lower tire mold section when the tire mold is being closed.

These and other objects and advantages of the invention will appear more clearly from the following specification in connection with the accompanying drawings, in which:

FIG. 1 diagrammatically illustrates the tire heating press according to the invention in opened condition with inserted raw tire.

Figure 1:
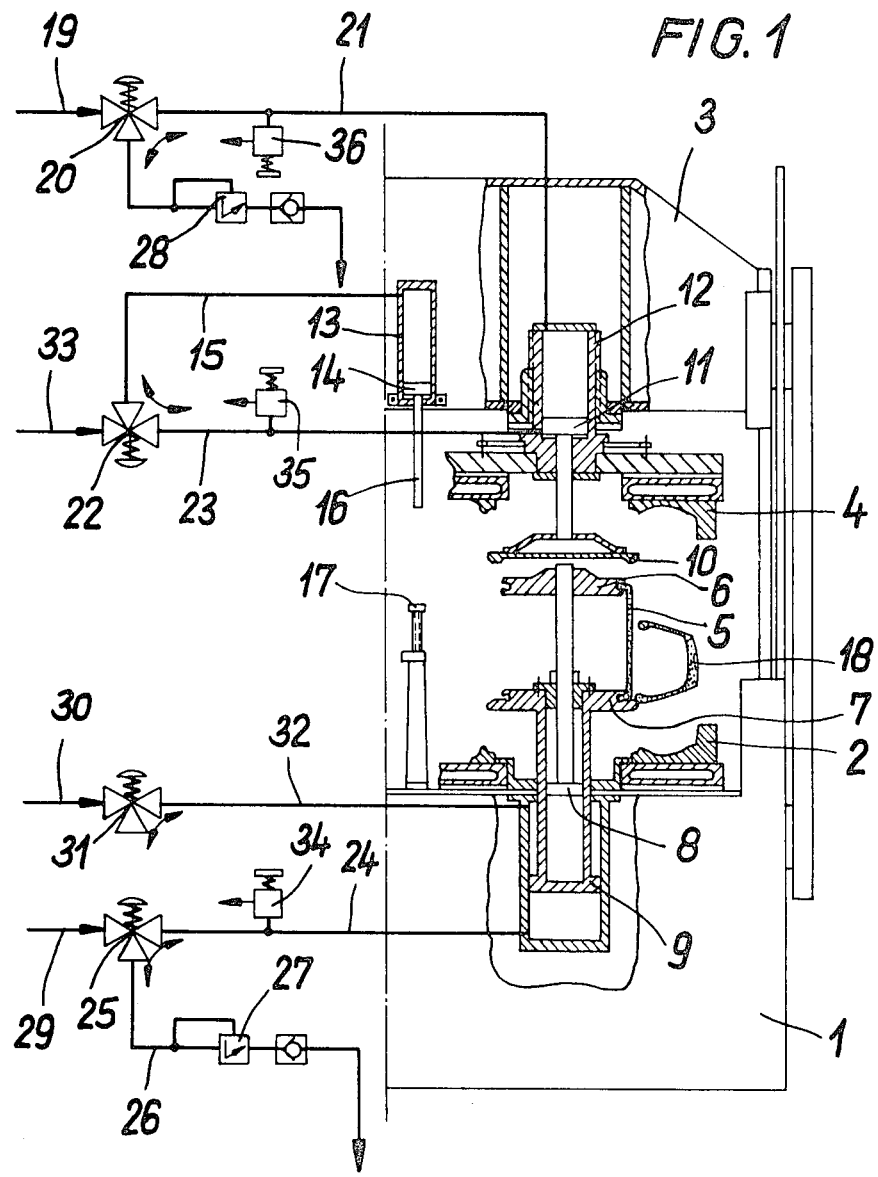

In conformity with the present invention, it is suggested to provide a control device which during the closing of the tire mold will see to it that the spacing or distance between the raw tire and the upper tire mold on one hand and the spacing between the raw tire and the lower tire mold on the other hand will remain equal. In this way it will be assured that the raw tire up to the time directly prior to the end of the closing operation of the tire mold will properly be held in centered position between the tire mold sections.

In conformity with the present invention, the tire heating press is so designed that one of the two bead forming rings is by means of a hydraulically operable piston during the closing operation of the tire mold movable toward the corresponding tire mold section at half the speed of the latter and will push back the other bead forming ring lifted out of the other tire mold section against a lower hydraulic counter pressure into the other tire mold section.

According to a further development of the invention, it is suggested that the cylinder of the lifting piston is in fluid communication with the cylinder of a control piston which during the closing of the tire mold is held stationary in its position by means of a control rod engaging an abutment. In this way, in connection with a corresponding adjustment of the hydraulic elements, a precise and safe guiding of the raw tire will be assured with a favorable course of movement.

In order to save additional control devices for further moving cycles, it is suggested, in accordance with the present invention, to provide the hydraulic drives and conduits with additional hydraulic connections and valves for a separate operation of the hydraulically operable elements outside the forced control during the closing of the tire heating press. Furthermore, the hydraulic drives and conduits are provided with safety valves.

Referring now to the drawings in detail, the tire mold comprises primarily a lower mold section 2 connected to the lower portion 1 of the press, and a tire mold section 4 arranged on the vertically displaceable press head 3. A curving bellows 5 is located between the upper bellows clamping ring 6 and the lower bellows clamping ring which latter with a lower bead forming ring forms a ring 7. The upper bellows clamping ring 6 and the ring 7 are each hydraulically movable relative to the tire mold section 2 by means of a bellows piston 8 and an annular piston 9. The upper bead forming ring 10 is movable by means of the lifting piston 11 relative to upper tire mold section 4. The cylinder 12 of the lifting piston 11 is through a conduit 15 in communication with the cylinder 13 of a control piston 14. The control piston 14 is provided with a control rod 16 located opposite an abutment 17 provided on the lower press portion 1.

Figure 2:
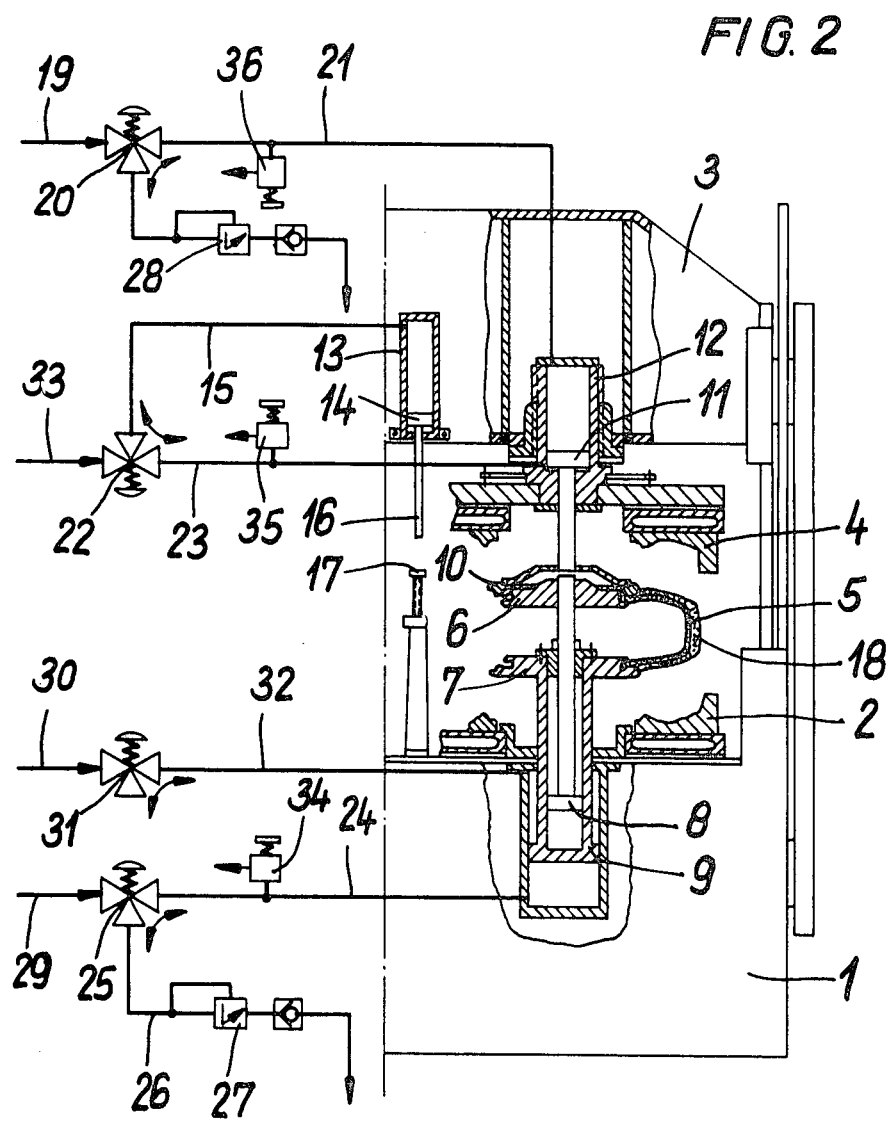
FIG. 2 shows the tire heating press according to the invention after the curving bellows have been moved inwardly.

When the raw tire 18 is moved into the press over the stretched curving bellows 5 and is deposited on ring 7, the upper bead forming ring 10, as will be seen from FIGS. 1 and 2, is moved out of the upper tire mold section 4. The hydraulic pressure is introduced through the conduit 19, the diaphragm valve 20 and the conduit 21 into the cylinder 12.

Figure 3:
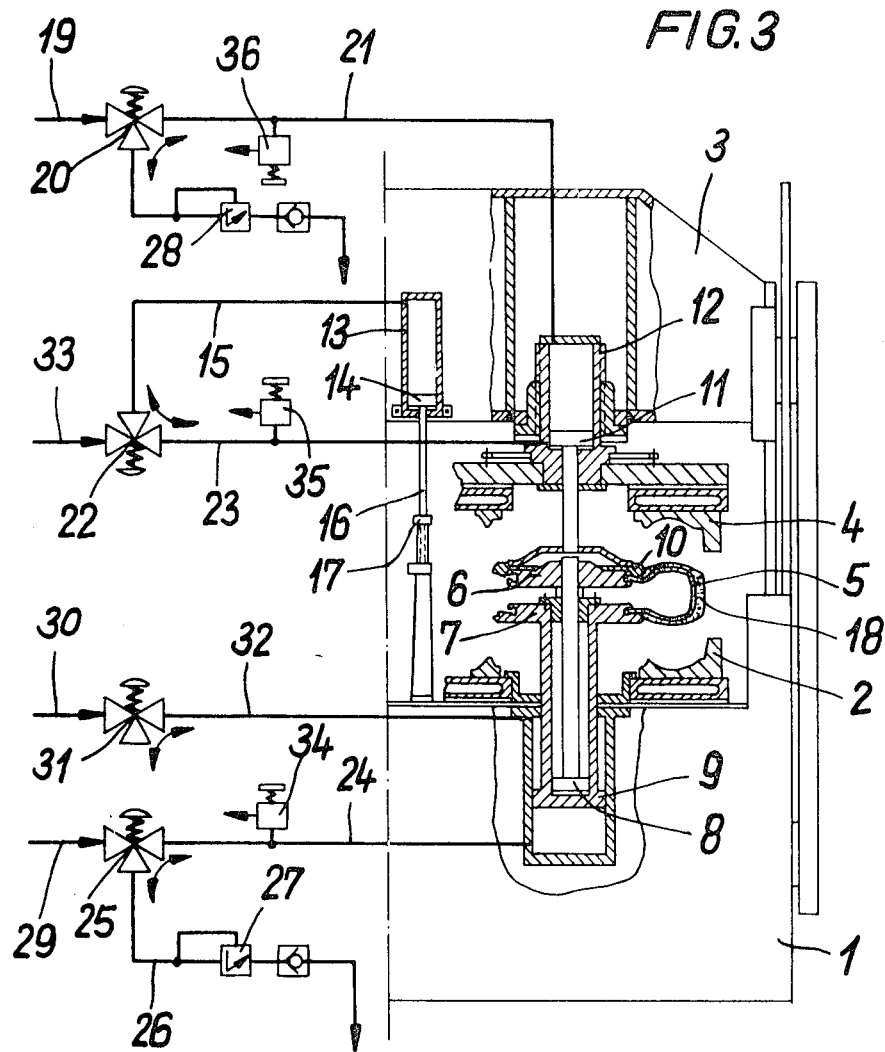
FIG. 3 shows the tire heating press according to the invention at the beginning of the closing operation of the tire mold.

After the raw tire 18 has been centered with the upper bead forming ring 10 as shown in FIG. 2, the upper bead forming ring 10, which retains its relative position to the upper tire mold section 4 and together with the latter and the press head 3 is lowered, will already have the upper bellows clamping ring 6 moved downwardly until simultaneously the upper bellows clamping ring 6 abuts the ring 7 and the control rod 16 at the abutment 17 (FIG. 3). Thereupon the closing of the tire mold starts. The control piston 14 presses hydraulic fluid through conduit 15 to the diaphragm valve 22 and the conduit 23 underneath the lifting piston 11. Inasmuch as the piston surfaces conform to each other, the lifting piston 11 moves at half the speed upwardly relative to the press head 3 which means its remaining downward speed drops to half the speed of the upper tire mold section 2.

Inasmuch as the ring 7 is carried along during the downward movement, also the raw tire 18 will during the closing operation remain in the center between the tire mold sections 2 and 4. The counter pressure of the hydraulic fluid which passes through conduit 24, diaphragm valve 25, and conduit 26 is adjusted lower at the overflow valve 27 than at the overflow valve 28 so that the counter pressure will not interfere with the downward movement.

Figure 4:
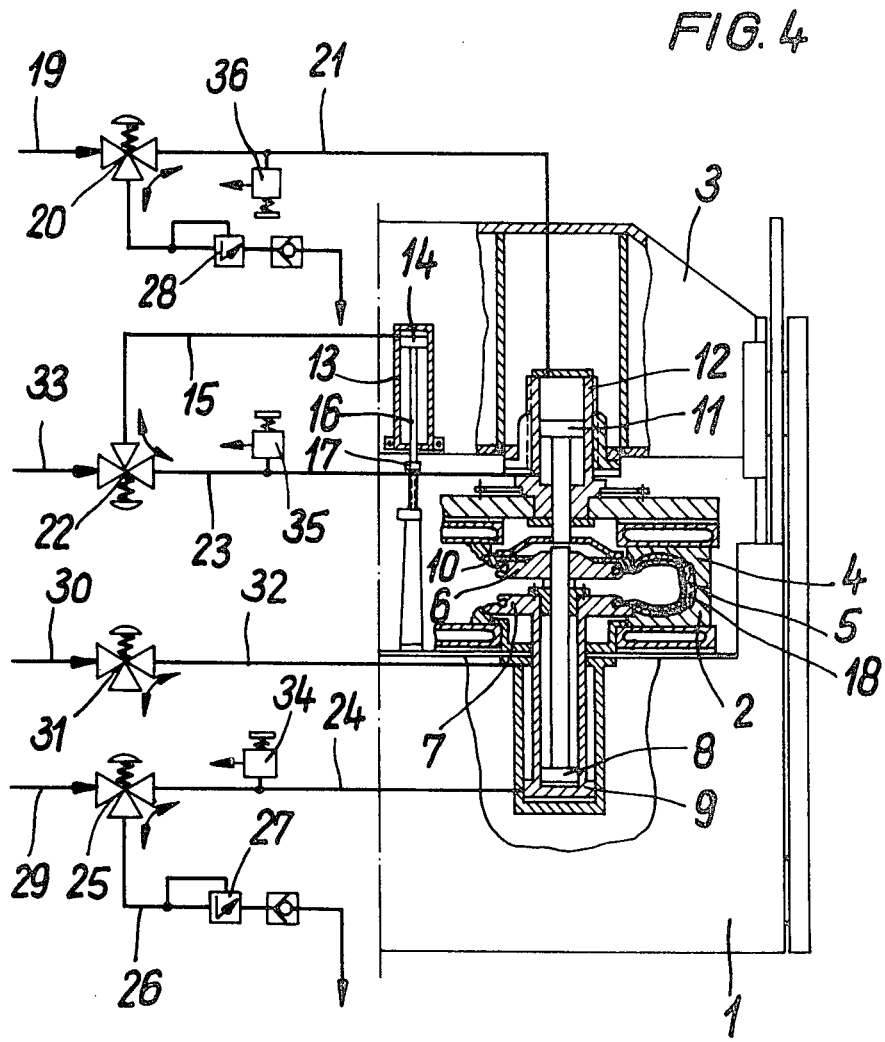
FIG. 4 shows the press according to the invention after the tire mold has been closed.

After the tire mold (FIG. 4) has been closed, the raw tire 18 is vulcanized. For the subsequent removal of the ring 7 from the lower tire mold section 2, a conduit 29 is connected to the diaphragm valve 25. Correspondingly, the connecting lines 30, the diaphragm valve 31, and the conduit 32 as well as the connecting line 33 communicating with the diaphragm valve 22 are provided for a separate inward movement of the ring 7 and of the upper bead forming ring 10. Safety valves 34, 35 and 36 are provided for protection of the arrangement against damages when disturbances should occur in the cycle.

It is, of course, to be understood that the present invention is, by no means, limited to the particular showing in the drawings but also comprises any modifications within the scope of the appended claims.

What I claim is:

1. A press for shaping a raw tire, especially a belted raw tire, and placing the same in a multi-sectional vulcanizing mold, which includes: a stationary press section adapted to receive and have connected thereto first sectional mold means, a movable press section arranged in alignment with said stationary press section and adapted to receive and have connected thereto second sectional mold means adapted with said first mold means to form a vulcanizing mold, holding means arranged between said stationary and movable press sections and movable relatively thereto for receiving and holding a raw tire to be vulcanized, control means operatively connected to said holding means and operable during the relative movement of said stationary and movable press sections toward each other to decrease the spacing between said holding means and said movable press section proportionally to the same extent as the spacing between said holding means and said stationary press section, said holding means including a first holding member operable to engage the bead section on one side of a raw tire and also including a second holding member operable to engage the bead section on the other side of a raw tire, fluid operable means supported by said stationary press section and respectively operatively connected to said first and second holding members, a first cylinder supported by said stationary press member, a hollow piston reciprocable in said first cylinder and connected to said first holding member, a second piston reciprocable in said hollow cylinder and connected to said second holding member, a second cylinder supported by said movable press section, a third piston reciprocable in said second cylinder upwardly at half speed relative to said movable press section and remaining downward speed dropping to half speed of said first sectional mold means, and means connected to said third piston and means for actuating and moving said second holding member and through the latter also said first holding member toward said stationary press member, said control means including means hydraulically connected to said third piston and means for moving the latter in the direction away from said stationary press member at half the speed at which said movable press section moves toward said stationary press section.

2. A press according to claim 1, which includes abutment means supported by said stationary press section, and in which the said means of said control means which is hydraulically connected to said third piston includes a cylinder with a piston reciprocable therein and provided with an extension for engagement with said abutment means when said movable press section starts its movement toward said stationary press section.

3. A press according to claim 2, which includes means operable independently of said control means for controlling the movement of all of said pistons and of the movable press section.

References Cited

FOREIGN PATENTS 1,386,801    4/1964    France.
1,096,189    12/1967    Great Britain.

J. SPENCER OVERHOLSER, Primary Examiner

D. S. SAFRAN, Assistant Examiner

U.S. Cl. X.R.

18—17 C, 17 T